May 21, 1963
R. N. ACKLES
3,090,078
PROCESS FOR FOAMING PANELS IN SITU
Filed May 29, 1958
3 Sheets-Sheet 1
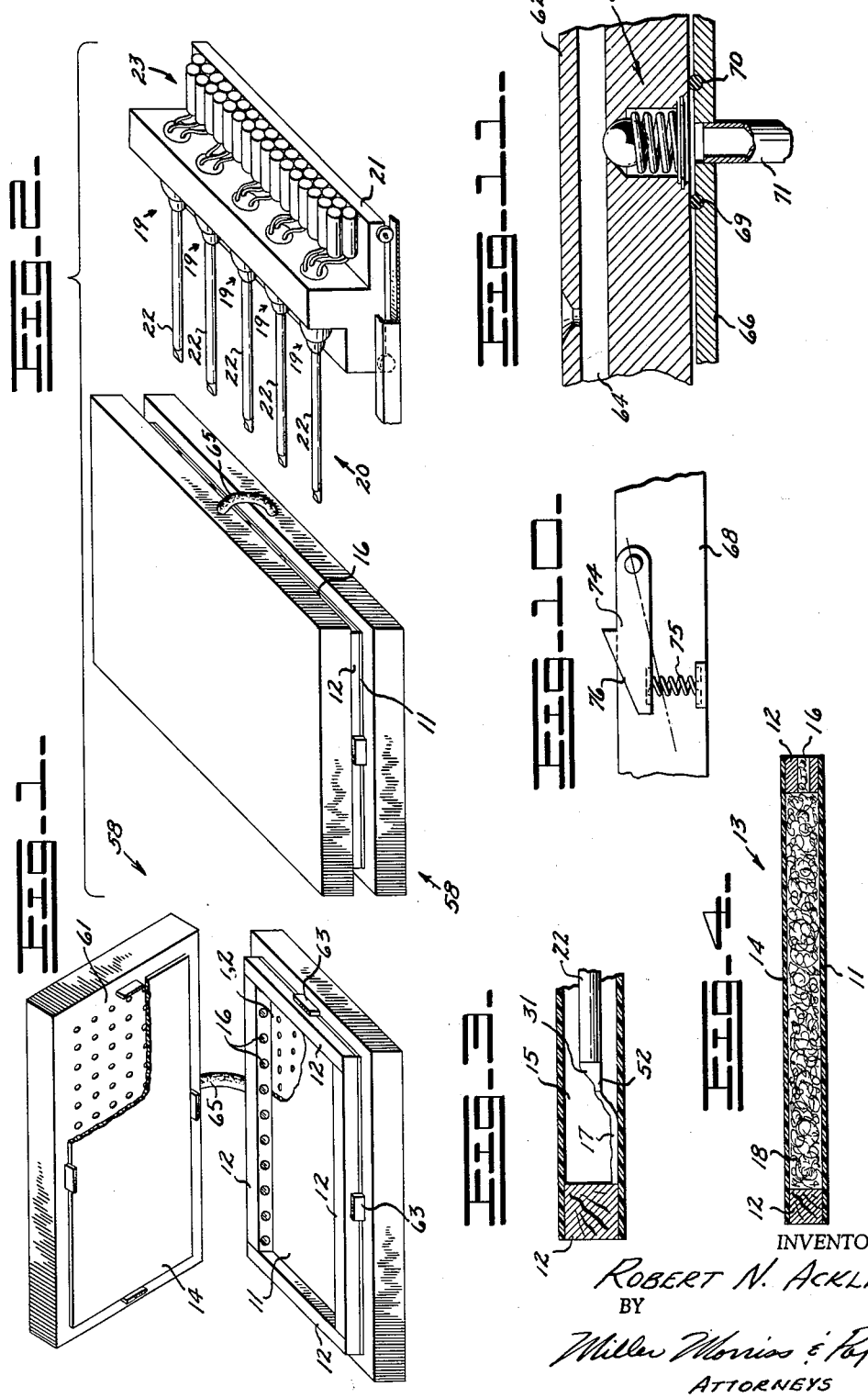
INVENTOR.
ROBERT N. ACKLES
BY
Miller Morris & Pappas
ATTORNEYS May 21, 1963
R. N. ACKLES
3,090,078
PROCESS FOR FOAMING PANELS IN SITU
Filed May 29, 1958
3 Sheets-Sheet 2
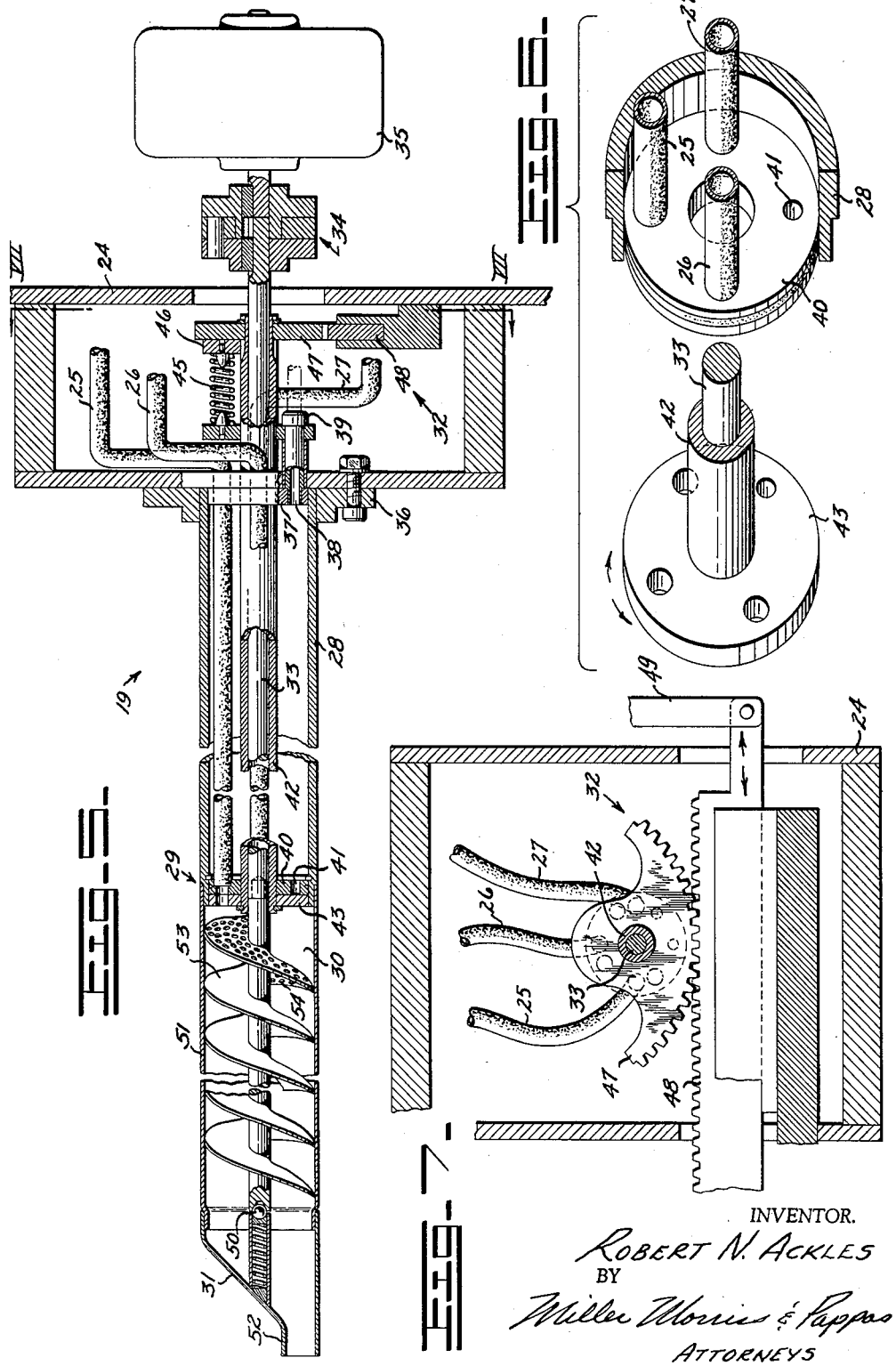
INVENTOR.
ROBERT N. ACKLES
BY
Miller Morris & Pappas
ATTORNEYS May 21, 1963
R. N. ACKLES
3,090,078
PROCESS FOR FOAMING PANELS IN SITU
Filed May 29, 1958
3 Sheets-Sheet 3
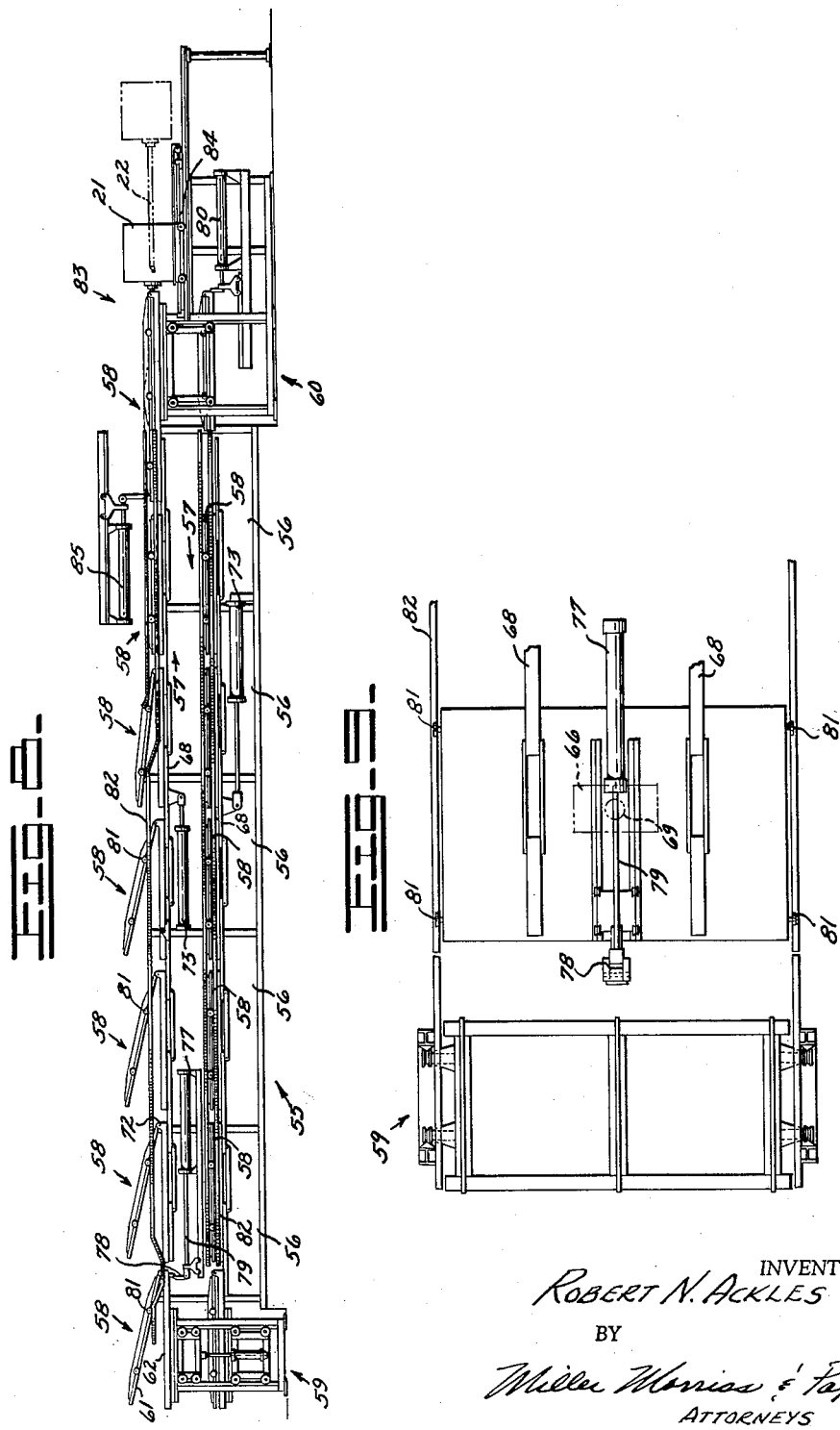
INVENTOR.
ROBERT N. ACKLES
BY
ATTORNEYS United States Patent Office 3,090,078
Patented May 21, 1963

3,090,078
PROCESS FOR FOAMING PANELS IN SITU
Robert N. Ackles, Flint, Mich., assignor to
A. M. Stackhouse, Ann Arbor, Mich.
Filed May 29, 1958, Ser. No. 738,820
6 Claims. (Cl. 18—59)

The present invention relates to a process for foaming the cores of structural panels in place. More particularly the process of the present invention relates to a simple process which is substantially automatic and eliminates much of the handwork hitherto required in the fabrication of panels having a foamed resin core.

With the advent of the foaming of resins, the insulating characteristics and the strength of such foamed material, with attendant reduction in weight, has enabled such material to replace other forms of packing and insulation previously used to form the core of structural panels. Conventional fabrication means were employed to make use of the foamed material. It was cut and shaped, and the strips thus formed were sandwiched between sheets of facing material and glued or wired into place. Cutting, fitting and securing of the foamed resin material was done by hand at considerable expense and with attendant slow production. The fitting of the foamed resin core was frequently inaccurate and as a consequence consistency of insulating and structural properties could not be readily standardized. Dimensional control was extremely difficult to achieve since strips of too great thickness resulted in non uniform sizing and the strips of too little thickness resulted in poor adhesion to the facing material and consequent mechanical or thermal failure. Where electrical circuits, plumbing elements, and framing was inserted in the panel, the strip fitting problem was greatly increased.

While foaming of resins-in-place has been practiced for sometime, no commercially practical system had been devised to serve the paneling industry. Conventional assembly procedures were continued and where the paneling systems employing a foamed resin core for thermal insulation and soundproofing existed, the industry continued to pack or load the foamed cores into the panel, dodging conduits, piping, and trying to maintain some semblence of standardization. The application of adhesives as between the facing material and the foamed resin was both expensive and time consumting.

Accordingly the object of the instant invention is to provide a process which substantially eliminates manual operations by foaming the resin core in situ.

Another object is to provide a process which assures uniformity of panel thickness.

Another object is to provide a process whereby an adhesive bond is automatically established as between the interior of each of the skin surfaces and the foamed core.

Another object is the utilization of apparatus capable of inserting a foaming or expanding resin between a pair of skin surfaces wherein the resin expands in situ to secure and bond to conduits, piping, framing, and the like prefabricated into the standardized panel.

Other objects include the provision of an extremely simple process that enables the user to obtain a marked increase in the production of panels, as will be readily appreciated by those skilled in the art as the description proceeds.

In the drawings:

FIGURE 1 is a somewhat schematic perspective view of a pair of open vacuum platens showing marginal spacers in place with skin facings in position.

FIGURE 2 is a somewhat schematic perspective showing a pair of loaded platens in position prior to filling and showing the injection and formulating nozzles on their bar mount and carriage prior to injection.

FIGURE 3 is a cutaway view of the nozzle tip retreating and spreading resin material between the skins for foaming.

FIGURE 4 is an elevational section view of a completed and cured panel showing the foamed resin material filling the cavity defined by the spacers and skins.

FIGURE 5 is a cross section elevation view taken through one of the formulating and ejecting nozzles showing its construction and indicating the interrelationship of valving, mixing, and formulating elements and indicating shut off control.

FIGURE 6 is a partially exploded view through the barrel portion of the formulating and ejecting nozzle and showing the operative interrelationship between barrel, conduit receiver, valve control tube and mixer shaft.

FIGURE 7 is a sectional plan view taken on the line VII—VII of FIGURE 5 and showing the valve control linkage connected to the valve control synchronizing bar.

FIGURE 8 is a side elevation view of the automated production line equipment, partially cut away for clarity with retraction of the nozzle in phantom line.

FIGURE 9 is a partial top plan view of the equipment shown in FIGURE 8 and partially cut away for clarity indicating camming engagement for platen control.

FIGURE 10 is an elevational detail view of an automation rail link showing the tapered cam striker portion and the platen grip for moving platen pairs in a single direction.

FIGURE 11 is a cross section view of the vacuum valve connections as between vacuum platen pairs and automation rail or stationary connection.

GENERAL DESCRIPTION

In general, the process of the present invention involves the laying down of one sheet of facing material which is to become one of the skin surfaces of the finished panel; the positioning of marginal spacer elements; the closing of the panel cavity by laying down a second skin on the frame formed by the spacing elements; and the insertion of the foamable resin composition into the cavity defined by the two surface skins and marginal spacers; and finally allowing the resin composition to expand to the definitional limits of the cavity and to adhere to the skins and spacers while expanding and curing in place.

Apparatus-wise, a novel formulating and mixing nozzle has been devised which comprises a nozzle extension barrel that extends the length or breadth of the particular panel and ejects a metered amount of foam forming material as it retreats from the panel cavity. These ejector elements are provided for plural mounting on a mounting bar. The mounting bar is secured to a carriage which extends and retracts to insert and withdraw the nozzles from the panel being filled.

For successively forming the panels in accord with the present process a closed path conveyor apparatus is employed, having a plurality of stations. The closed path accommodates a plurality of pairs of vacuum faced hinged platens. The uppermost of the platen pairs is arranged to open and close in accord with a prearranged cam track in association with the machine frame. At loading and unloading stations the hinged platens are open, the vacuum holding the inserted skins in position. As the platens close and open after the loading of the skins, the vacuum snaps both skins into indexed position. Marginal spacers are loaded onto the skin retained by one of the platens and materials such as electrical conduits, plumbing connections and desired frame components are also inserted. Then the platens are closed pressing both skins marginally against the spacers. The vacuum applied to the exterior of the skins by the platen avoids slumping in the skin surface. In this condition the platen set is delivered to the resin injection station. The carriage mounted resin injector is inserted into the cavity formed by skins and spacers. Upon "bottoming," the injector lays down a coating of a foamable resin composition in spaced apart uniform lines as the injector nozzles retreat with the carriage from the cavity. The nozzles are withdrawn and the panels are locked in the form, during which time the resin foams and expands to fill the aforementioned cavity and curing is initiated. Upon return of the platen pairs along the closed path, the platens are opened and the panel product is removed. The stripped platen is then returned for reloading and recycling. In all stations on the closed course, except for the initial loading and final removal steps, the vacuum is applied to the platens securing the skins to the platen faces while pressing the margin of the skins into dimensional contact with the marginal spacers. The frame supporting the first of the flights and the second return flight of platen sets is modular in construction so that the user can insert additional stations, where necessary.

Successive movement of the platen sets is accomplished by means of front and rear cylinders. Travel through the upper and lower flight is managed by an upper and lower automation rail. The automation rail is vacuum supplied to serve the maintenance of vacuum throughout the movement cycle of platen. Fixed vacuum brackets supply the vacuum when the platens are in a stationary station on the apparatus.

Valving on the platens pick up the vacuum as it is supplied by either the automation rail or the fixed brackets.

In operation, the line operates continuously, a full cycle being completed in about 6.5 minutes with each "dwell" and "movement" requiring about 15 seconds each. This arrangement allows about 3.25 minutes for at least partial curing in place. In some instances curing of the foamed resin may be substantially completed within this period of time.

Panels produced by the process meet rigid dimensional standards of stability and the foamed-in-place core provides excellent filling of the panel cavity, with complete encapsulation of imbedded conduits and the like resulting.

PROCESS

The process of the present invention is best sequentially described with reference to FIGURES 1–4, inclusive. A first skin 11, comprising a pre-formed plastic or resin reinforced sheet is laid down. Marginal spacers or barriers 12, which later become a part of the completed panel 13, are peripherally arranged to form a spacer frame or dam about the skin 11. A second skin 14 is closed upon the frame formed by the barriers 12. With the mating skin 11 and the barrier elements 12, this second skin 14 forms or defines an opening 15, making the hollow or cavity portion of a sandwich. Access openings 16, defined in one of the barrier elements 12 allow the insertion of a quantity of the foamable resin composition 17. The resin 17 is uniformly spread by retreating the source of supply from the opposite end of the cavity 15 through the access openings 16. The foam formulated resin 17 is then allowed to expand and to uniformly fill the cavity 15. The thus foamed core 18 completely fills the cavity 15 and adheres or bonds to the skin surfaces and the barrier surfaces defining the cavity 15. Thus the foaming occurs in situ to provide good structural support for the finished panel 13 and any surplus of foamed material 18 is forced out of the access openings 16 where it is eventually trimmed from the finished product.

The general production sequence thus described is highly amenable to continuous operation as will be appreciated as the description proceeds. Coordination of the sequencing in automatic, continuous production is in large measure controlled by the chemical and physical characteristics of the resin formulation 17 selected for foaming of the resin core 18 since this formulation factor controls the time allowable for insertion of the expandable resin 17 and for the time required for expansion and subsequent curing in situ of such resin 17. A highly satisfactory resin formulation has been discovered which allows for expansion in about 15 seconds with a sufficient curing time of about 3.25 minutes in situ under ambient room conditions and without the application of accelerating heat or light. The process thus described allows for the insertion of conduits, piping, and other members prior to foaming so as to completely encapsulate the components positioned between the skins 11 and 14. FIGURE 4 best illustrates a finished panel 13.

APPARATUS

Novel apparatus has been devised to facilitate the practice of the foregoing process and to make possible automated production. An ejector nozzle or gun 19 was devised so as to permit mixing, agitation, and formulation of the foam formulated resin 17 adjacent the point of ejection. The gun 19 is provided to be inserted in a cavity to be filled with foamable resin 17 and then ejects the resin 17 in a retreating path. When employed in batteries 20 of spaced apart guns 19, the filling operation can cover a selected area for uniform filling. The battery 20 type of gun usage is best illustrated in FIGURE 3 where the battery 20 is mounted on a carriage 21 which extends the nozzle portion 22 of the guns 19 into a desired cavity to be filled. Such a carriage 21 is served by metering pumps 23 mounted in plural banks on the carriage to feed metered raw material to the guns 19. FIGURE 5 is a section view showing the structure of the gun 19. A housing 24 substantially encloses the drive mechanism of the gun 19 and carries a plurality of conduits 25, 26, and 27. The conduits 25, 26, and 27 deliver resin in metered amounts through the barrel 28 to operating valve 29 and thence into the mixing chamber 30, where the plurality of components are intimately admixed for ultimate ejection through nozzle tip 31.

The housing 19, as will be appreciated, may have a variety of forms, dependent upon any desired specific mounting arrangement. With reference to FIGURE 7, the specific form described is generally rectangular and encloses valve control mechanism 32 and provides journalling and support for the drive shaft 33 and conduit entries. A flexible coupling 34 connects the drive shaft 33 to the drive motor 35. Preferably, the drive motor 35 is variable as to speed. A hub 36, attached to the housing 24, provides mounting means for the tubular barrel 28. A spacer cylinder 37 seals the end of the barrel 28 adjacent the housing and spacedly retains the conduits 25, 26 and 27. The spacer 37 is provided with an orifice 38 which cooperates with the flush connection 39 to communicate flushing solvent to the barrel 28. At the end of the barrel 28, remote from the drive end, a valve plate 40 is fixed and sealed peripherally to the barrel 28. The conduits 25, 26, and 27 are connected to the plate 40 as best indicated in FIGURE 6. The plate 40 is also provided with a flush orifice 41 therethrough, communicating the solvent contents of the barrel 28 with the mixing chamber 30. A bearing tube 42 extends axially through the housing 24, hub 36, spacer 37, valve plate 40 and barrel 28 and is connected to a lower valve plate 43. The mating surfaces of fixed plate 40 and lower plate 43 are lapped to form an adequate liquid seal. The lower plate 43 is provided with a plurality of openings which selectively correspond to openings in the plate 40 and the flush orifice 41. Thus it will be seen as illustrated in FIGURES 6 and 7, that as the bearing tube 42 is rotated the movable plate 43 either matches or mismatches selected openings to communicate the contents of the conduits 25, 26, and 27 with the mixing chamber 30. This is arranged so that metered amounts of a plurality of formulation components enter the mixing chamber 30 simultaneously. The two plates 40 and 43 thus form a valve 44 which either admits formulation components to the mixing chamber 30, stops the admixture, or admits flushing solvent carried in the barrel 28 in response to turning of the tubular bearing 42. A compression spring 45, acting on the housing 24 at one end and against an abutment ring 46 attached to the bearing tube 42 at the other end, provides axial pressure as between the two valve plates 40 and 43. Rotation of the plate 43 by rotation of the tube bearing 42 selects the delivery as desired to the mixing chamber 30. This is accomplished by the movement of the sector gear 47 locked to the tubular bearing 42 and engaged with the rack 48. Lineal movement of the rack 48 thus causes selected rotation of the sector gear 47 and results in selected positioning of the valve 44. FIGURE 7 best illustrates the described actuation. In individual installations, the rack 48 may be hand operated. When a plural installation of guns 19 is employed, as in battery 20, the synchronizing bar 49 can be moved so as to simultaneously select identical conditions for a plurality of units as shown in a carriage setting in FIGURES 2 and 8, for example.

The drive shaft 33 which extends through the bearing tube 42 is rotatable therein and journalled thereby and extends for substantially the entire length of the gun 19 extending axially through the mixing chamber 30 to contact the spring loaded thrust bearing 50 in the end of the mixing sleeve 51 at the nozzle tip 31. The tip 31 is provided with a flared delivery port 52. The shaft 33 is driveably connected to a spiral screw or auger type mixer 53 confined in the mixing sleeve 51 and operating axially therein. The blades 54 of the mixer 53 are perforate, as illustrated in FIGURE 5. The object of the mixer 53 is to provide adequate spiral mixing and shear which thoroughly admixes the resin material 17 prior to emission from the nozzle tip 31.

The following examples illustrate the foamable resin compositions 17 of the present invention as used in the process and apparatus herein described.

*Example I—Foamable Resin Composition*

A. Formulation A: Parts by weight
   Polyester resin (Polylite 8601—Reichhold Chemical Company) _____ 50.0
B. Formulation B:
   Dimethylethanolamine _____ 03.0
   Polyoxyethylene derivatives of fatty acid partial esters of hexitol anhydrides (Tween 40— Atlas Powder Company) _____ 1.0
C. Formulation C:
   Polyester resin (Polylite 8601—Reichhold Chemical Company) _____ 22.0
   Toluenediisocyanate (Hilene) _____ 78.0

In preparing the complete resin composition capable of self-expansion or foaming in situ, the above formulations were employed as follows:

Parts by weight
Formulation A _____ 50.0
Formulation B _____ 1.1
Water _____ 2.5
Formulation C _____ 84.0

The contents of Formulation B, the water, and Formulation C were admixed and the resulting composition admixed with Formulation A, immediately prior to use, to give the completed foamable resin composition. Such composition readily expanded in situ, without external application of heat, to give the desired foamed core.

Alternatively, Formulations A and C, and the water have been pre-mixed and then combined with the Formulation B to yield the final, foamable polyurethane resin composition. When foamed, the resulting core exhibited a density of approximately 2 pounds per cubic foot and a crushing strength of about 48 pounds per square inch. The pot life of the composition was about 25 seconds.

*Example II—Foamable Resin Composition*

A. Formulation A: Parts by weight
   Polyester resin (Polylite 8601—Reichhold Chemical Company) _____ 40
   Polyester resin (Polylite 8120—Reichhold Chemical Company) _____ 10
B. Formulation B:
   Diethylene triamine _____ 03.0
   Polyoxyethylene derivatives of fatty acid partial esters of hexitol anhydrides (Tween 40— Atlas Powder Company) _____ 1.0
C. Formulation C:
   Polyester resin (Polylite 8601—Reichhold Chemical Company) _____ 22.0

In preparing the complete resin composition 17 capable of expanding in situ, the above formulations were employed as follows:

Parts by weight
Formulation A _____ 50.0
Formulation B _____ 0.5
Water _____ 1.0
Formulation C _____ 84.0

The Formulations A and C, and the water were predispersed and added to Formulation B immediately prior to use, i.e., in the dispensing apparatus.

The resulting foamable resin composition 17 had a pot life substantially longer than that of the composition of Example I, due in part to the smaller amount of catalyst employed (Formulation B), while the foamed core 18, upon curing, showed greater flexibility than the cured foam of Example I because of the inclusion in Formulation A of a substantial amount of a rather flexible polyester resin (Polylite 8120).

In practice, the component formulations of the foamable resin composition are introduced into the mixing chamber 30 (see FIGURE 5) through the conduits 25, 26 and 27. For example, in Example I above the Formulations A and C and water are predispersed and passed through conduit 25 while Formulation B is passed through conduit 26, the final admixing taking place in the chamber 30. Where the pot life of the foamable resin composition is fairly long, predispersion of the various component formulations may be eliminated and each passed directly through the respective conduits into the mixing chamber.

In the above polyurethane compositions, the Formulations A and C comprise the basic resin components. A wide variety of commercially available polyesters are operative, the precise choice depending in part upon the properties desired in the foamed core. Other resins, such as the epoxy resins, e.g. reaction products of epichlorohydrin and bis-phenol A catalyzed with a polyfunctional amine having an active hydrogen, may be employed, although the polyesters are preferred. Other commercially available isocyanate modifier resins may be substituted for the toluenediisocyanate of Formulation C and their ratio of use to the polyesters may be varied in order to achieve the desired properties in the finished core, e.g. flexibility, adhesion and the like. For some applications, a substantially rigid foamed core 18 is required, while in other instances a foamed core exhibiting some flexibility is desired. Proper regulation of the individual resin components in Formulations A and C enables the degree of flexibility or rigidity in the core to be controlled.

The catalyst for the resins forms the primary component of Formulation B. Other catalysts having active hydrogen groups such as triethanolamine, diethylene triamine, m-phenylene diamine, and the like may be successfully employed. At the same time, a surface active agent or wetting agent may conveniently be incorporated to give greater uniformity of pore size to the finished foamed core. The preferred agents are the polyoxyethylene derivatives of the fatty acid partial esters of hexitol anhydrides (Tweens) although other surfactants such as the pluronics (Wyandotte Chemical) and tergitols may be successfully employed. Such agents also reduce the surface tension of the foamable compositions, thereby permitting them to wet the surfaces of the skins more readily upon application, thus reducing or overcoming any surface friction. The amount of Formulation B may be varied from as little as 0.5 to about 4.0 or more parts by weight of the combined resins of Formulations A and C. Thus, the pot life of the foamable compositions may be varied from as low as 5 seconds to as much as 3 or 4 minutes to conform to the required production schedule of the apparatus.

The water is employed to provide ample vapor for blowing purposes. Since the catalyzed reaction is highly exothermal in nature, the water is readily reacted with the isocyanate group of the resin, thereby liberating carbon dioxide and providing the desired pores in the finished foam. The water content of the foamable resin composition may be successfully varied from as small as 0.5 to 3.0 or more parts by weight of the combined resin content. If desired, additional blowing agents, e.g. sodium bicarbonate or sulfonated hydrocarbons, may be used where it is desirable to have more carbon dioxide or sulfur dioxide or trioxide, respectively available in the foaming media.

The foamable resin compositions 17 of the present invention may impart densities of between about 1.5 to 20 or more pounds per cubic foot to the foamed cores 18. Generally, densities between 2.0 and 10.0 pounds per cubic foot are preferred. Cores in this range have good flexibility and adhesion to the skins 11 and 14 and possess satisfactory impact resistance and dimensional stability. The adhesion at the interface between the core and the skins is good, especially where both polyester skins and foamable polyester resin compositions have been employed. Similarly, the barriers 12 are secured to the thus foamed cores 18 by the adhesive action of the resin compositions 17.

When cured cores 18 of exceptionally high impact strength are required, as in the preparation of floor panels, or where epoxy skins have been selected for use in the panels the epoxy resins may be utilized in Formulations A and C, in which event other blowing agents, such as celogen, and those illustrated above as liberating carbon dioxide or sulfur trioxide are preferably employed. In addition to the polyfunctional amines illustrated above, other catalysts providing active hydrogens, such as acetic anhydride, may be used to catalyze the epoxy resin system.

In general where soundproofing or other qualities associated with closed cell foams are required, the foamable resin compositions 17 preferably embody the polyester rather than the epoxy resins.

In automation of the process herein described the following apparatus has provided a highly efficient means for continuous production of panels 13. With reference to FIGURE 8 a frame structure 55 is provided. The frame 55 comprises a plurality of sections 56 which are substantially identical and when locked together in elongate adjacent relationship provide a pair of flights 57 which constitute a closed path conveyor, each section 56 serving as a station for positioning of moving platen pairs 58. A lift elevator 59 is provided at one end of the frame 55. A drop elevator 60 is provided at the other end of the frame 55. The elevators 59 and 60 provide transfer means moving the platen pairs 58 from one of the flights 57 to the other of the flights 57, thus closing the pathway movement of the platen pairs 58.

With reference to FIGURE 1, each of the platen pairs 58 comprises an upper vacuum surface 61 and a lower vacuum surface 62. Locating bars 63 provide framing control over placement of skins 11 and 14 and barriers 12. The skins 11 and 14, as referred to in this application, are preferably preformed reinforced resin sheets, such as fiberglass reinforced polyester or epoxy resin sheets. These skins may also be wooden, metal or plastic sheet stock, for example, and may likewise comprise resin laminated or bonded plywood or aluminum sheets. Since the foamable resin compositions 17 adhere well to all of these various skin materials, the process and apparatus of this invention have general applicability to the production of cored panels having many varying skin or facing surfaces. Each of the surfaces 61 and 62 is served by a vacuum cavity 64, which cavities 64 (FIGURE 11) are connected by means of hose 65 located on the hinge side of the platen pairs 58. Vacuum is applied to the platen pairs 58 in the "dwell" position at each station center through a vacuum valve pad 66 (located in phantom line in FIGURE 9). While the platens 58 are in motion vacuum is supplied to the platen pairs 58 through valves 67, served by vacuum connection in the automation rail 68. The valve 67 comprises a ball check type unit best illustrated in FIGURE 11 and is identical whether in engagement with the automation rail 68 or vacuum pad 66. Adequate seal as between pad 66 or rail 68 and the platen pair 58 is by means of an O ring 69 seated in adequate annular grooves 70. The vacuum connections or leads 71 are positioned as illustrated in FIGURE 11 and are served by a vacuum source not illustrated. As shown schematically in FIGURE 1 the object of the vacuum surfaces 61 and 62 is to provide retention means for the skins 11 and 14. In the case of the upper surface 61, the vacuum surface 61 separates the upper skin 14 from the barriers 12 while the platen pairs 58 are open. During closure of the platen pairs 58 on their hinges 72, the vacuum acting on the skins 11 and 14 assures that no slumping of the skins will occur prior to or during foaming in situ while the surfaces 61 and 62 themselves serve to impart adequate retention pressures to seal the periphery of the skins 11 and 14 to the barriers 12.

The automation rails 68 run substantially the length of the frame 55 serving each of the flights 57. The automation rails 68 are reciprocated by hydraulically operated cylinders 73. The uppermost of the cylinders 73 retracting while the lowermost of the automation cylinders is extending. A portion of one of the rails 68 is shown in FIGURE 10. Hinged to the rail 68 are platen gripping pawls 74. The pawls 74 are spring loaded, the spring 75 biasing the pawl 74 into gripping position. The ramp or cam surface 76 allows the rail 68 to move past a mating moving dog attached to each of the plated pairs 58. However, the pawl 74, upon return draws the platen pair 58 with it. At the station adjacent the lift elevator 59, a loading cylinder 77 having a latch 78 on its piston 79 reciprocates to draw the platen pair 58 from its lifted position and onto the uppermost of the flights 57. Subsequent movement is by way of the automation rails 68. Outboard of the drop elevator 60 and beneath the carriage 21 (FIGURE 8) is located a pusher cylinder 80 which ejects a platen pair 58 from the elevator 60 and onto the lower flight 57.

As will be appreciated with reference to FIGURE 8, the upper vacuum surface 61 is opened or closed in relation to the lower vacuum surface 62 in accord with the position of control followers 81 attached to the upper vacuum surface 61 and riding on the cover control rail 82. In this manner, as seen in FIGURE 8, the platen pairs 58 are opened as they reach the upper portion of the lift elevator 59. This permits the insertion of a pair of skins 11 and 14. The platen pairs 58 then close as they are drawn away from the elevator 59 and vacuum is applied as hereinbefore set forth. The action of the vacuum snaps skin 11 into position on the lower vacuum surface 62 and lifts the skin 14 into contact with the upper vacuum surface 61. Then the platen pair 58 is reopened for the insertion of barrier frames 12 and any other insertions not shown. The vacuum surfaces 61 and 62 are then closed and remain closed as they travel along the flights 57 until they reach the lower part of the lift elevator 57. There the vacuum is released from the platen pair 58 and the platen pairs are separated for unloading. The control rail 82 thus controls selected opening and closing of the platen pairs 58 as they move through the stations. As the closed platen pair 58 approaches the injection station 83, the carriage 21 is driven to meet the moving platen pair 58, and the nozzles 22 of the injection guns 19 in battery 20 pass through the openings 16 in the barrier 12 and penetrate to substantial contact with the wall of the cavity 15 opposite the point of entry. The carriage 21, having been driven by carriage cylinder 84, is then retreated. During retreating movement of the carriage the metered formulation enters the mixing chambers 30 of the gun 19, where the resin formulation is thoroughly admixed and emitted for uniform retreating dispersion in the cavity 15. The material 17 then expands to form the core 18 of foamed resin material. With the platen 58 closed, the platen 58 is moved along the lower flight 57 in the closed control position until adequate curing in situ has been accomplished.

Movement off of the upper flight 57 and onto elevator 60 is accomplished by the pusher cylinder 85 which is mounted above the path of the platen pairs 58.

The opening and closing sequencing thus described allows for insertion of panel components, separates the skins 11 and 14 and allows for positioning of the framed barriers 12. The vacuum faces 61 and 62 assure control over slumping of the skins 11 and 14 and during injection of guns 19 and emission of foam formulated resin 17 into the cavity 15. The cam and cam follower control over opening and closing of the platen pairs 58 establishes rigid dimensional control over the expanding and curing phases of the process.

It will be appreciated that power components, such as hydraulic pumps, and sequencing controls are well known in the art as contributing power for motion and for control over the apparatus sequencing. Such controls are not illustrated but will be readily understood in the art.

Similarly, variations can be anticipated where a greater or larger number of stations are desired. The process apparatus described is timed for 15 second interval in each movement and "dwell." Employing the described formulation, the 15 seconds provide sufficient time for loading, filling, and curing.

The resulting process provides finished foam cored panels 13 at a rate of one panel every 15 seconds and provides for adequate foaming and curing over a complete cycle time of about 6.25 minutes. Panels 13, thus constructed, are very durable and are inexpensive in contrast to those produced by hand lay-up equipment and procedures. The resulting product 13 is uniform as to quality and is produced in accord with the present invention so as to avoid slumping of the skins 11 and 14 into the cavity 15.

Having thus described my invention, other modifications may be made from time to time in the process thus described, and such modifications are intended to be included herein, limited only by the scope of the appended claims.

I claim:

1. In a process for foaming panels in situ, the steps which include; applying marginal spacers between a pair of thin walled skin sheets; supporting said sheets in spaced apart relationship by vacuum and by back-up in avoidance of pump; introducing by injector a foamable resin composition into the cavity between said sheets at one end of said cavity; retreating said injector while the filling of said cavity with said composition is progressing; and curing said composition in place in contact with said sheets and said spacers.

2. In a process for the continuous step-wise production of foamed in place cored panels, the steps which include: laying down a first skin of sheet material; marginally applying spacer stock to said first skin; closing a second skin upon said spacer and holding said second skin in fixed spaced apart relation from said first skin; inserting by injector a foamable resin composition in the cavity foamed between said spaced apart sheets; in a quantity which upon expansion at least fills said cavity withdrawing the resin composition injector in a direction parallel to said sheets and from between said sheets; allowing said resin composition to expand into bonding contact with said sheets atnd said spacers to fill said cavity; curing the thus formed cored panels in place; and withdrawing the completed panels.

3. In a process for the continuous step-wise production of foamed in place cored panels, the steps which include: laying down a first skin of sheet material; marginally applying spacer stock to said first skin; closing a second skin upon said spacer with pressure sufficient to seal said spacer to said skins along the edges thereof while providing vacuum holding of both of said sheets against slumping and in substantial parallel spaced apart relationship and in support against humping, inserting a resin injector between said sheets; applying a source of resin between said sheets; applying a quantity of a foamable resin composition sufficient upon expansion to at least fill in the cavity formed between said spaced apart sheets while withdrawing the resin composition injector; allowing said resin composition to expand into bonding contact with said sheets and spacer stock to fill said cavity; curing the thus formed cored panels in place; and withdrawing completed panels.

4. In a process for foaming a resin composition in situ to fill a cavity defined by a pair of spaced apart skins of sheet material held marginally separated by a peripheral frame, the steps which include: holding said skins in spaced apart parallel relationship with vacuum to prevent slumping into said cavity; depositing a foam resin composition between said sheets and through an edge of said frame and applying back up pressure to said skins to marginally seal them against said peripheral frame and to prevent humping upon expansion of said foam resin composition.

5. In a process for the continuous production of foamed in place cored panels, the steps which include: laying down a first skin sheet of material; placing marginal spacer strips one of said strips defining access openings therethrough; closing a second skin sheet upon said margin strips in substantial spaced apart register with said first sheet; vacuum holding said sheets in spaced apart parallel relation; inserting an injector of foamed resin between said sheets and through said access openings; applying a quantity of a foamable resin in the cavity formed between said spaced apart sheets and sufficient upon expansion to at least fill said cavity while withdrawing said resin injector; allowing said resin composition to expand into bonding contact with said sheets and marginal spaces to fill said cavity; curing the thus formed cored panels.

6. In a process for forming a foamed core panel structure in situ and comprising a pair of external skins and peripheral spacers, the steps which include: placing a first skin sheet on a vacuum positioning and back up member; placing marginal spacer pieces on said first skin, one of said spacers having openings therethrough; applying a second skin on a vacuum positioning and back up member in parallel register with said first skin; pressing said second skin while vacuum holding into contact with said marginal spacers to form a cavity; inserting an ejector into said openings; emitting a foamable composition into said cavity in such a quantity as to at least fill said cavity upon expansion while withdrawing said ejector from said cavity; expanding and curing said resin in contact with said spacers and said skins while continuing said vacuum and pressure control over said skins, while repeating said insertion and emission in successively presented cavities.

References Cited in the file of this patent

UNITED STATES PATENTS

| | | |
|---|---|---|
| 541,529 | Genese | June 25, 1895 |
| 1,948,344 | Fischer | Feb. 20, 1934 |
| 2,027,165 | Grubman | Jan. 7, 1936 |
| 2,271,058 | Binns | Jan. 27, 1942 |
| 2,634,244 | Simon et al. | Apr. 7, 1953 |
| 2,662,243 | Schnuck et al. | Dec. 15, 1953 |
| 2,698,838 | Simon et al. | Jan. 4, 1955 |
| 2,704,380 | Cuzzi | Mar. 22, 1955 |
| 2,727,278 | Thompson | Dec. 20, 1955 |
| 2,744,042 | Pace | May 1, 1956 |
| 2,762,739 | Weiss | Sept. 11, 1956 |
| 2,827,665 | Rogers et al. | Mar. 25, 1958 |
| 2,913,772 | Buchkremer et al. | Nov. 24, 1959 |
| 2,951,261 | Sherman | Sept. 6, 1960 |

FOREIGN PATENTS

| | | |
|---|---|---|
| 842,267 | Germany | Sept. 15, 1952 |